United States Patent
Bittar et al.

(10) Patent No.: US 9,411,068 B2
(45) Date of Patent: Aug. 9, 2016

(54) 3D BOREHOLE IMAGER

(75) Inventors: Michael S. Bittar, Houston, TX (US);
Jing Li, Pearland, TX (US); Stephen A. Zannoni, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 456 days.

(21) Appl. No.: 13/061,759

(22) PCT Filed: Nov. 23, 2009

(86) PCT No.: PCT/US2009/065537
§ 371 (c)(1),
(2), (4) Date: Mar. 2, 2011

(87) PCT Pub. No.: WO2010/060040
PCT Pub. Date: May 27, 2010

(65) Prior Publication Data
US 2011/0251794 A1    Oct. 13, 2011

Related U.S. Application Data (60) Provisional application No. 61/117,433, filed on Nov. 24, 2008.

(51) Int. Cl.
*G06F 19/00* (2011.01)
*G01V 3/12* (2006.01)
(Continued)

(52) U.S. Cl.
CPC ... *G01V 3/30* (2013.01); *G01V 3/10* (2013.01); *G01V 3/18* (2013.01)

(58) Field of Classification Search
CPC .................................................. G01V 3/30
USPC ............... 702/6, 8, 9, 10, 11, 12, 13, 38, 155
See application file for complete search history.

(56) References Cited

U.S. PATENT DOCUMENTS 3,496,455 A    2/1970 Gouilloud
3,849,721 A    11/1974 Calvert
(Continued)

FOREIGN PATENT DOCUMENTS

AU    2009318042    2/2014
EP    1315984    1/2011
(Continued)

OTHER PUBLICATIONS

"PCT Int'l Search Report and Written Opinion", dated Jan. 19, 2010, Appl No. PCT/US09/65537, "A 3D Borehole Imager", filed Nov. 23, 2009, 7 pgs.

(Continued)

*Primary Examiner* — John Breene
*Assistant Examiner* — Yaritza H Perez Bermudez
(74) *Attorney, Agent, or Firm* — Krueger Iselin LLP; Benjamin Fite (57) ABSTRACT

Logging tools and methods for obtaining a three-dimensional (3D) image of the region around a borehole. In at least some embodiments, a 3D imaging tool rotates, transmitting pulses that are approximately a nanosecond long and measuring the time it takes to receive reflections of these pulses. Multiple receivers are employed to provide accurate triangulation of the reflectors. In some cases, multiple transmitters are employed to obtain compensated measurements, i.e., measurements that compensate for variations in the receiver electronics. Because reflections occur at boundaries between materials having different dielectric constants, the 3D imaging tool can map out such boundaries in the neighborhood of the borehole. Such boundaries can include: the borehole wall itself, boundaries between different formation materials, faults or other discontinuities in a formation, and boundaries between fluids in a formation. Depending on various factors, the size of the borehole neighborhood mapped out can be as large as 1 meter.

18 Claims, 4 Drawing Sheets

(51) Int. Cl.
*G01V 3/30* (2006.01)
*G01V 3/18* (2006.01)
*G01V 3/10* (2006.01)

(56) References Cited

U.S. PATENT DOCUMENTS

| | | | |
|---|---|---|---|
| 3,914,603 A | 10/1975 | Paap et al. | |
| 3,944,910 A | 3/1976 | Rau | |
| 4,104,596 A | 8/1978 | Smither | |
| 4,258,321 A | 3/1981 | Neale | |
| 4,278,941 A | 7/1981 | Freedman | |
| 4,297,699 A | 10/1981 | Fowler et al. | |
| 4,365,322 A | 12/1982 | Widrow | |
| 4,430,653 A | 2/1984 | Coon et al. | |
| 4,504,833 A | 3/1985 | Fowler et al. | |
| 4,626,773 A | 12/1986 | Kroeger et al. | |
| 4,670,717 A | 6/1987 | Sender | |
| 4,689,569 A | 8/1987 | Duff | |
| 4,704,581 A | 11/1987 | Clark | |
| 4,721,853 A | 1/1988 | Wraight | |
| 4,730,161 A | 3/1988 | Cox et al. | |
| 4,814,768 A | 3/1989 | Chang | |
| 4,825,421 A | 4/1989 | Jeter | |
| 4,829,488 A | 5/1989 | Siegfried, II. | |
| 4,909,336 A | 3/1990 | Brown et al. | |
| 4,968,940 A | 11/1990 | Clark et al. | |
| 5,113,192 A | 5/1992 | Thomas | |
| 5,115,198 A | 5/1992 | Gianzero et al. | |
| 5,133,418 A | 7/1992 | Gibson et al. | |
| 5,155,198 A | 10/1992 | Keohan | |
| 5,159,978 A | 11/1992 | Tomek et al. | |
| 5,210,495 A | 5/1993 | Hapashey et al. | |
| 5,248,975 A | 9/1993 | Schutz | |
| 5,318,123 A | 6/1994 | Venditto et al. | |
| 5,345,179 A | 9/1994 | Habashy et al. | |
| 5,357,253 A | 10/1994 | Van Etten et al. | |
| 5,367,262 A | 11/1994 | Manning | |
| 5,377,104 A | 12/1994 | Sorrells et al. | |
| 5,377,105 A | 12/1994 | Smith | |
| 5,389,881 A | 2/1995 | Bittar et al. | |
| 5,400,030 A | 3/1995 | Duren et al. | |
| 5,420,589 A | 5/1995 | Wells et al. | |
| 5,434,507 A | 7/1995 | Beren et al. | |
| 5,469,062 A | 11/1995 | Meyer, Jr. | |
| 5,503,225 A | 4/1996 | Withers | |
| 5,530,359 A | 6/1996 | Habashy et al. | |
| 5,552,786 A | 9/1996 | Xia et al. | |
| 5,557,580 A | 9/1996 | Numaga et al. | |
| 5,631,562 A | 5/1997 | Cram et al. | |
| 5,720,354 A * | 2/1998 | Stump et al. | 175/26 |
| 5,720,355 A | 2/1998 | Lamine et al. | |
| 5,747,750 A | 5/1998 | Bailey et al. | |
| 5,757,191 A | 5/1998 | Gianzero | |
| 5,765,642 A | 6/1998 | Surjaatmadja | |
| 5,811,973 A | 9/1998 | Meyer, Jr. | |
| 5,892,361 A | 4/1999 | Meyer, Jr. et al. | |
| 5,900,833 A | 5/1999 | Sunlin et al. | |
| 5,917,160 A | 6/1999 | Bailey | |
| 6,078,867 A * | 6/2000 | Plumb et al. | 702/6 |
| 6,100,839 A | 8/2000 | Heger et al. | |
| 6,163,155 A | 12/2000 | Bittar | |
| 6,173,793 B1 | 1/2001 | Thompson et al. | |
| 6,179,066 B1 | 1/2001 | Nasr et al. | |
| 6,181,138 B1 | 1/2001 | Hagiwara et al. | |
| 6,191,586 B1 | 2/2001 | Bittar | |
| 6,191,588 B1 | 2/2001 | Chen | |
| 6,216,783 B1 | 4/2001 | Hocking et al. | |
| 6,218,842 B1 | 4/2001 | Bittar | |
| 6,353,321 B1 | 3/2002 | Bittar | |
| 6,359,438 B1 | 3/2002 | Bittar | |
| 6,389,438 B1 | 5/2002 | Zhou | |
| 6,460,936 B1 | 10/2002 | Abramov et al. | |
| 6,476,609 B1 | 11/2002 | Bittar | |
| 6,496,137 B1 | 12/2002 | Johansson | |
| 6,538,447 B2 | 3/2003 | Bittar | |
| 6,633,252 B2 | 10/2003 | Stolarczyk et al. | |
| 6,651,739 B1 | 11/2003 | Arndt et al. | |
| 6,672,409 B1 | 1/2004 | Dock et al. | |
| 6,712,140 B2 | 3/2004 | Van Oers et al. | |
| 6,714,153 B1 | 3/2004 | Kong et al. | |
| 6,755,263 B2 | 6/2004 | Alft et al. | |
| 6,765,385 B2 | 7/2004 | Sinclair et al. | |
| 6,771,206 B2 | 8/2004 | Berthelier et al. | |
| 6,778,127 B2 | 8/2004 | Stolarczyk et al. | |
| 6,799,117 B1 | 9/2004 | Proett et al. | |
| 6,810,331 B2 | 10/2004 | Bittar et al. | |
| 6,819,110 B2 | 11/2004 | Omeragic et al. | |
| 6,856,132 B2 * | 2/2005 | Appel et al. | 324/303 |
| 6,885,943 B2 | 4/2005 | Bittar et al. | |
| 6,911,824 B2 | 6/2005 | Bittar | |
| 6,918,293 B2 | 7/2005 | Moake et al. | |
| 6,925,031 B2 | 8/2005 | Kriegshauser et al. | |
| 6,940,446 B2 | 9/2005 | Cist | |
| 6,944,546 B2 | 9/2005 | Xiao et al. | |
| 6,958,610 B2 | 10/2005 | Gianzero | |
| 6,961,663 B2 | 11/2005 | Sinclair et al. | |
| 7,013,991 B2 | 3/2006 | Wilson-Langman et al. | |
| 7,019,528 B2 | 3/2006 | Bittar | |
| 7,038,455 B2 | 5/2006 | Beste et al. | |
| 7,046,009 B2 | 5/2006 | Itskovich | |
| 7,046,010 B2 | 5/2006 | Hu et al. | |
| 7,098,664 B2 | 8/2006 | Bittar et al. | |
| 7,098,858 B2 | 8/2006 | Bittar et al. | |
| 7,123,016 B2 | 10/2006 | Larsen | |
| 7,138,803 B2 | 11/2006 | Bittar | |
| 7,143,844 B2 | 12/2006 | Alft et al. | |
| 7,202,670 B2 | 4/2007 | Omeragic et al. | |
| 7,227,363 B2 | 6/2007 | Gianzero et al. | |
| 7,242,194 B2 | 7/2007 | Hayman et al. | |
| 7,265,552 B2 | 9/2007 | Bittar | |
| 7,296,462 B2 | 11/2007 | Gregory et al. | |
| 7,306,056 B2 | 12/2007 | Ballantyne et al. | |
| 7,336,222 B2 | 2/2008 | Praskovsky et al. | |
| 7,345,487 B2 | 3/2008 | Bittar et al. | |
| 7,350,568 B2 | 4/2008 | Mandal et al. | |
| 7,425,830 B2 | 9/2008 | Banning et al. | |
| 7,425,831 B2 | 9/2008 | Banning et al. | |
| 7,427,863 B2 | 9/2008 | Bittar | |
| 7,460,060 B2 | 12/2008 | Aoki | |
| 7,557,579 B2 | 7/2009 | Bittar | |
| 7,557,580 B2 | 7/2009 | Bittar | |
| 7,609,065 B2 | 10/2009 | Banning et al. | |
| 7,659,722 B2 | 2/2010 | Bittar | |
| 7,746,078 B2 | 6/2010 | Bittar et al. | |
| 7,775,276 B2 | 8/2010 | Pelletier et al. | |
| 7,825,664 B2 | 11/2010 | Homan et al. | |
| 7,839,148 B2 | 11/2010 | Vehra et al. | |
| 7,839,346 B2 | 11/2010 | Bittar et al. | |
| 7,948,238 B2 | 5/2011 | Bittar | |
| 7,982,464 B2 | 7/2011 | Bittar et al. | |
| 8,030,937 B2 | 10/2011 | Hu et al. | |
| 8,085,049 B2 | 12/2011 | Bittar et al. | |
| 8,085,050 B2 | 12/2011 | Bittar et al. | |
| 8,222,902 B2 | 7/2012 | Bittar et al. | |
| 8,264,228 B2 | 9/2012 | Bittar et al. | |
| 8,378,908 B2 | 2/2013 | Wisler et al. | |
| 2001/0022238 A1 | 9/2001 | Houwelingen et al. | |
| 2001/0022464 A1 | 9/2001 | Seear | |
| 2002/0167314 A1 | 11/2002 | Prammer | |
| 2002/0177427 A1 | 11/2002 | Nadgauda et al. | |
| 2002/0195247 A1 | 12/2002 | Ciglenec et al. | |
| 2003/0051914 A1 | 3/2003 | Bittar | |
| 2003/0056983 A1 | 3/2003 | Alft et al. | |
| 2003/0080743 A1 * | 5/2003 | Das et al. | 324/338 |
| 2003/0137301 A1 * | 7/2003 | Thompson et al. | 324/338 |
| 2003/0184302 A1 | 10/2003 | Omeragic et al. | |
| 2003/0223620 A1 * | 12/2003 | Anxionnaz et al. | 382/109 |
| 2004/0008027 A1 | 1/2004 | Prammer | |
| 2004/0019427 A1 | 1/2004 | San Martin et al. | |
| 2004/0027131 A1 | 2/2004 | Bittar | |
| 2004/0108853 A1 | 6/2004 | Rosthal | |
| 2004/0123655 A1 * | 7/2004 | MacPherson | 73/152.03 |
| 2004/0196184 A1 | 10/2004 | Hollander et al. | |
| 2005/0083063 A1 | 4/2005 | Omeragic et al. | |

(56) References Cited

U.S. PATENT DOCUMENTS

| | | | |
|---|---|---|---|
| 2005/0134280 A1 | 6/2005 | Bittar et al. | |
| 2005/0150692 A1 | 7/2005 | Ballantyne et al. | |
| 2005/0230107 A1 | 10/2005 | McDaniel et al. | |
| 2005/0231436 A1* | 10/2005 | McLean et al. | 343/786 |
| 2006/0022887 A1 | 2/2006 | Bittar | |
| 2006/0033502 A1 | 2/2006 | Bittar | |
| 2006/0061364 A1 | 3/2006 | Banning et al. | |
| 2006/0157277 A1 | 7/2006 | Bittar et al. | |
| 2006/0173624 A1 | 8/2006 | Frenkel | |
| 2006/0244455 A1 | 11/2006 | Bittar | |
| 2006/0255811 A1 | 11/2006 | Bittar et al. | |
| 2007/0079989 A1 | 4/2007 | Bankston et al. | |
| 2007/0137854 A1 | 6/2007 | Homan et al. | |
| 2007/0235225 A1 | 10/2007 | Bittar | |
| 2007/0256830 A1 | 11/2007 | Entov et al. | |
| 2008/0078580 A1 | 4/2008 | Bittar | |
| 2008/0079432 A1 | 4/2008 | Meyer et al. | |
| 2008/0128166 A1 | 6/2008 | Forgang et al. | |
| 2008/0258733 A1 | 10/2008 | Bittar | |
| 2008/0315884 A1 | 12/2008 | Bittar et al. | |
| 2009/0015260 A1 | 1/2009 | Bittar | |
| 2009/0138202 A1* | 5/2009 | Tang et al. | 702/7 |
| 2009/0210161 A1 | 8/2009 | Duenckel et al. | |
| 2009/0224764 A1 | 9/2009 | Bittar | |
| 2009/0230968 A1 | 9/2009 | Bittar et al. | |
| 2009/0277630 A1 | 11/2009 | McDaniel et al. | |
| 2009/0278543 A1 | 11/2009 | Beste et al. | |
| 2009/0302851 A1 | 12/2009 | Bittar et al. | |
| 2009/0309798 A1 | 12/2009 | Bittar et al. | |
| 2009/0310441 A1* | 12/2009 | Johnson et al. | 367/35 |
| 2009/0315563 A1 | 12/2009 | Fox et al. | |
| 2010/0012377 A1 | 1/2010 | Sharp et al. | |
| 2010/0117655 A1 | 5/2010 | Bittar | |
| 2010/0127708 A1 | 5/2010 | Bittar | |
| 2010/0134111 A1 | 6/2010 | Itskovich | |
| 2010/0262370 A1 | 10/2010 | Bittar et al. | |
| 2010/0284250 A1 | 11/2010 | Cornish et al. | |
| 2011/0006773 A1 | 1/2011 | Bittar | |
| 2011/0221443 A1 | 9/2011 | Bittar et al. | |
| 2012/0283951 A1 | 11/2012 | Li et al. | |
| 2014/0032116 A1 | 1/2014 | Guner et al. | |

FOREIGN PATENT DOCUMENTS

| | | |
|---|---|---|
| EP | 1155343 | 3/2011 |
| FR | 2561395 | 9/1985 |
| GB | 1111629 | 5/1968 |
| GB | 1363079 A | 8/1974 |
| GB | 2030414 | 4/1980 |
| GB | 2352259 | 1/2001 |
| GB | 2475456 | 11/2012 |
| JP | 4001392 | 1/1992 |
| JP | 8094737 A | 4/1996 |
| WO | WO-0000852 | 1/2000 |
| WO | WO-0148353 | 7/2001 |
| WO | WO-03080988 | 10/2003 |
| WO | WO-2006079154 A1 | 8/2006 |
| WO | WO-2007/149106 | 12/2007 |
| WO | WO-2007/149146 | 12/2007 |
| WO | WO-2008/021868 | 2/2008 |
| WO | WO-2008/154679 | 12/2008 |
| WO | WO-2010/059275 | 5/2010 |
| WO | WO-2010/060040 | 5/2010 |
| WO | WO-2012/144977 | 10/2012 |

OTHER PUBLICATIONS

"PCT Intl Seach Report and Written Opinion", dated Oct. 20, 2009, Appl No. PCT/US09/054470, "Fracture Characterization Using Directional Electromagnetic Resistivity Measurements", filed Aug. 20, 2009, 13 pgs.

Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/467,427, filed May 18, 2009.

Bittar, Michael S., "Resistivity Logging with Reduced Dip Artifacts", PCT Appl No. US2007/075455, filed Aug. 8, 2006.

Bittar, Michael S., et al., "A 3D Borehole Imager and a Dielectric Measurement Tool", PCT Appl No. US09/65537, filed Nov. 23, 2009.

Bittar, Michael S., et al., "Antenna Coupling Component Measurement Tool Having a Rotating Antenna Configuration", U.S. Appl. No. 12/294,557, filed Sep. 25, 2008.

Bittar, Michael S., et al., "Look-Ahead Boundary Detection and Distance Measurement", U.S. Appl. No. 12/067,582, filed Mar. 20, 2008.

Bittar, Michael S., et al., "Method and Apparatus for Building a Tilted Antenna", U.S. Appl. No. 12/306,954, filed Dec. 30, 2008.

Bittar, Michael S., et al., "Method and Apparatus with High Resolution Electrode Configuration for Imaging in Oil-Based Muds", U.S. Appl. No. 12/680,868, filed Mar. 30, 2010.

Bittar, Michael S., et al., "Multimodal Geosteering Systems and Methods", U.S. Appl. No. 12/679,502, filed Mar. 23, 2010.

Bittar, Michael S., et al., "Systems and Methods for Displaying Logging Data", U.S. Appl. No. 12/295,158, filed Sep. 29, 2008.

Callaghan, G. "HFSS Modeling of Cross-Coupling in Borehole Radar", The Institution of Electrical Engineers, printed and published by IEEE, 2002, pp. 217-221.

Daniels, David J., "Surface-Penetrating Radar", Electronics & Communication Engineering Journal, Aug. 1996, pp. 165-182.

Gianzero, Stanley et al., "Method and Apparatus Having Antennas Configured to Measure Electrical Anisotropy", U.S. Appl. No. 10/173,528, filed Jun. 17, 2002.

Gianzero, Stanley et al., "Method and Apparatus Having Antennas Configured to Measure Electrical Anisotropy", U.S. Appl. No. 10/957,415, filed Oct. 1, 2004.

Liu, Sixin et al., "Application of Borehole Radar for Subsurface Physical Measurement", Nanjing Institute of Geophysical Prospecting and Institute of Physics Publishing, J. Geophys. Eng. 1 (2004), pp. 221-227.

Liu, Sixin et al., "Electromagnetic Logging Technique Based on Borehole Radar", IEEE Transactions on Geoscience and Remote Sensing, vol. 40, No. 9, Sep. 2002, pp. 2083-2092.

Van Dongen, Koen W., et al., "A Directional Borehole Radar System", Subsurface Sensing Technologies and Applications, vol. 3, No. 4, Oct. 2002, pp. 327 346.

Luling, Martin G., et al., "Processing and Modeling 2-MHz Resistivity Tools in Dipping, Laminated, Anisotropic Formations: SPWLA", SPWLA 35th Annual Logging Symposium, Paper QQ, Jun. 19-22, 1994, (1994), p. 1-25.

Zhu, Tianfei, et al., "Two Dimensional Velocity Inversion and Synthetic Seismogram Computation", Geophysics, vol. 52, No. 1, (Jan. 1987), p. 37-49.

Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), 18 pgs.

Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), 23 pgs.

Bonner, S. et al., "A New Generation of Electrode Resistivity Measurements for Formation Evaluation While Drilling", *SPWLA 35th Annual Lodging Symposium*, (Jun. 19, 1994),pp. 1-19.

Mack, S. G., et al., "MWD Tool Accurately Measures Four Resistivities", *Oil & Gas Journal*, (May 25, 1992),pp. 1-5.

Hagiwara, T. "A New Method to Determine Horizontal-Resistivity in Anisotropic Formations Without Prior Knowledge of Relative Dip", *37th Annual SPWLA Lodging Symposium*, New Orleans, LA, (Jun. 16, 1996),pp. 1-5 , plus 3 pgs of Figs.

Bittar, Michael S., "A New Azimuthal Deep-Reading Resistivity Tool for Geosteering and Advanced Formation Evaluation", 2007 SPE Annual Technical Conference and Exhibition, SPE 109971, (Nov. 11, 2007), pp. 1-9, Anaheim, CA, USA.

Bittar, Michael S., et al., "The Effects of Rock Anisotropy on MWD Electromagnetic Wave Resistivity Sensors", SPWLA 35th Annual Logging Symposium, (Jun. 19, 1994),18 pgs.

(56) References Cited

OTHER PUBLICATIONS

Clark, Brian et al., "A Dual Depth Resistivity Measurement for Fewd", SPWLA 29th Annual Logging Symposium, (Jun. 1988), 25 pgs.

Clark, Brian et al., "Electromagnetic Propagation Logging While Drilling: Theory and Experiment", *SPE Formation Evaluation*, (Sep. 1990), pp. 263-271.

Mechetin, V. F., et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, (Date Unkn),17 pgs.

Meyer, W. H., "New Two Frequency Propagation Resistivity Tools", SPWLA 36th Annual Logging Symposium, Jun. 26-29, 1995,12 pgs.

Rodney, Paul F., et al., "Electromagnetic Wave Resistivity MWD Tool", SPE Drilling Engineering, Oct. 1986, p. 337-346.

Cheung, P. et al., "Field Test Results of a New Oil-Based Mud Formation Imager Tool", SPWLA 42nd Annual Logging Symposium, 14 pgs., (Jun. 17, 2001).

Lofts, J. et al., "A New Micor-Resistivity Imaging Device for Use in Oil-Based Mud", SPWLA 43rd Annual Logging Symposium, 14 pgs., (Jun. 2, 2002).

PCT International Search Report and Written Opinion, dated Oct. 8, 2009, Appl No. PCT/US09/053354, "A High Frequency Dielectric Measurement Tool", filed Aug. 11, 2009, 11 pgs.

PCT International Preliminary Report on Patentability, dated Jun. 3, 2011, Appl No. PCT/US2009/065537, "A 3D Borehole Imager", filed Nov. 23, 2009, 6 pgs.

PCT International Preliminary Report on Patentability, dated Jun. 3, 2011, Appl No. PCT/US2009/053354, "A High Frequency Dielectric Measurement Tool", filed Aug. 11, 2009, 8 pgs.

PCT International Search Report and Written Opinion, dated Jul. 26, 2011, Appl No. PCT/US2011/032865, "Multicomponent Borehole Radar Systems and Methods", filed Apr. 18, 2011, 8 pgs.

AU First Exam Report, dated Feb. 3, 2012, Appl No. 2009318042, "A High Frequency Dielectric Measurement Tool", filed Aug. 11, 2009, 4 pgs.

PCT International Preliminary Report on Patentability, dated Mar. 1, 2012, Appl No. PCT/US2009/054470, "Fracture Characterization Using Directional Electromagnetic Resistivity Measurements", filed Aug. 20, 2009, 9 pgs.

AU Second Exam Report, dated Mar. 1, 2013, Appl No. 2009318042, "A High Frequency Dielectric Measurement Tool", filed Aug. 11, 2009, 4 pgs.

US Non-Final Office Action, dated Apr. 5, 2013, U.S. Appl. No. 13/128,676, "A High Frequency Dielectric Measurement Tool", filed Aug. 11, 2009, 23 pgs.

AU Third Examination Report, dated Jul. 3, 2013, Appl No. 2009318042, "A High Frequency Dielectric Measurement Tool", filed Aug. 11, 2009, 3 pgs.

US Final Office Action, dated Jul. 10, 2013, U.S. Appl. No. 13/128,676, "A High Frequency Dielectric Measurement Tool", filed Aug. 11, 2009, 23 pgs.

International Preliminary Report on Patentability, dated Jun. 10, 2013, Appl No. PCT/US2011/032865, "Multicomponent Borehole Radar Systems and Methods", filed Apr. 18, 2011, 17 pgs.

US Non-Final Office Action, dated Nov. 20, 2013, U.S. Appl. No. 13/131,872, "Fracture Characterization Using Directional Electromagnetic Resistivity Measurements," filed May 20, 2011, 22 pgs.

US Final Office Action, dated Apr. 1, 2014, U.S. Appl. No. 13/131,872, "Fracture Characterization Using Directional Electromagnetic Resistivity Measurements," filed May 30, 2011, 14 pgs.

US Final Office Action, dated May 7, 2014, U.S. Appl. No. 13/128,676, "A High Frequency Dielectric Measurement Tool", filed May 11, 2011, 22 pgs.

AU Patent Examination Report No. 3, dated Apr. 20, 2015, Appl No. 2011366229, "Multicomponent Borehole Radar Systems and Methods," Filed Apr. 18, 2011, 3 pgs.

CA Examination Report, dated Feb. 23, 2015, Appl No. 2,831,277, "Multicomponent Borehole Radar Systems and Methods," filed Apr. 18, 2011, 4 pgs.

US Non-Final Office Action, dated Sep. 23, 2014, U.S. Appl. No. 13/131,872, "Fracture Characterization Using Directional Electromagnetic Resistivity Measurements," filed May 30, 2011, 17 pgs.

US Final Office Action, dated Feb. 11, 2016, U.S. Appl. No. 13/131,872, "Fracture Characterization Using Directional Electromagnetic Resistivity Measurements," filed Aug. 20, 2009, 15 pgs.

* cited by examiner

3D BOREHOLE IMAGER

CROSS-REFERENCE TO RELATED APPLICATIONS

This application claims priority to Provisional U.S. Pat. App. 61/117,433, filed Nov. 24, 2008 by inventors Michael S. Bittar, Jing Li and Stephen A. Zannoni, which is hereby incorporated herein by reference.

BACKGROUND

Oil field operators seek as much information as possible regarding parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging, "logging while drilling" (LWD), drillpipe conveyed logging, and coil tubing conveyed logging.

In wireline logging, a probe or "sonde" is lowered into the borehole after some or all of the well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

In drillpipe- or coil tubing-conveyed logging, sensing instruments are mounted on a tubing string, which moves the instrument package through an existing borehole. The tubing string enables logging of horizontal well bores without requiring the sensing instruments to tolerate the hostile drilling environment. Typically, the measurement data is stored in internal memory and recovered along with the instrument package.

Most logging tools acquire a single depth-dependent measurement, enabling a driller to see the measurement of temperature, pressure, density, resistivity, natural gamma radiation, borehole diameter, etc., as a function of depth. A few existing logging tools offer measurements as a function of depth and rotational angle, enabling a driller to see, e.g., an image of the borehole wall. A very few existing logging tools offer measurements as a function of depth and radial distance from the borehole (e.g., induction tools having multiple depths of investigation). While each of these tools is useful to some degree, they leave the driller with an incomplete picture of the situation downhole.

BRIEF DESCRIPTION OF THE DRAWINGS

A better understanding of the various disclosed embodiments can be obtained when the following detailed description is considered in conjunction with the attached drawings, in which.

While the invention is susceptible to various modifications and alternative forms, specific embodiments thereof are shown by way of example in the drawings and will herein be described in detail. It should be understood, however, that the drawings and detailed description thereto are not intended to limit the disclosure, but on the contrary, the intention is to cover all modifications, equivalents and alternatives falling within the scope of the appended claims.

DETAILED DESCRIPTION

The problem identified in the background is at least partly addressed by the logging tools and methods disclosed herein for obtaining a three-dimensional (3D) image of the region around a borehole. In at least some embodiments, a 3D imaging tool rotates, transmitting pulses that are approximately a nanosecond long and measuring the time it takes to receive reflections of these pulses. Multiple receivers are employed to provide accurate triangulation of the reflectors. In some cases, multiple transmitters are employed to obtain compensated measurements, i.e., measurements that compensate for variations in the receiver electronics. Because reflections occur at boundaries between materials having different dielectric constants, the 3D imaging tool can map out such boundaries in the neighborhood of the borehole. Such boundaries can include: the borehole wall itself, boundaries between different formation materials, faults or other discontinuities in a formation, and boundaries between fluids in a formation. Depending on various factors, the size of the borehole neighborhood mapped out by this 3D imaging tool can be as large as 1 meter.

Figures 1, 2:
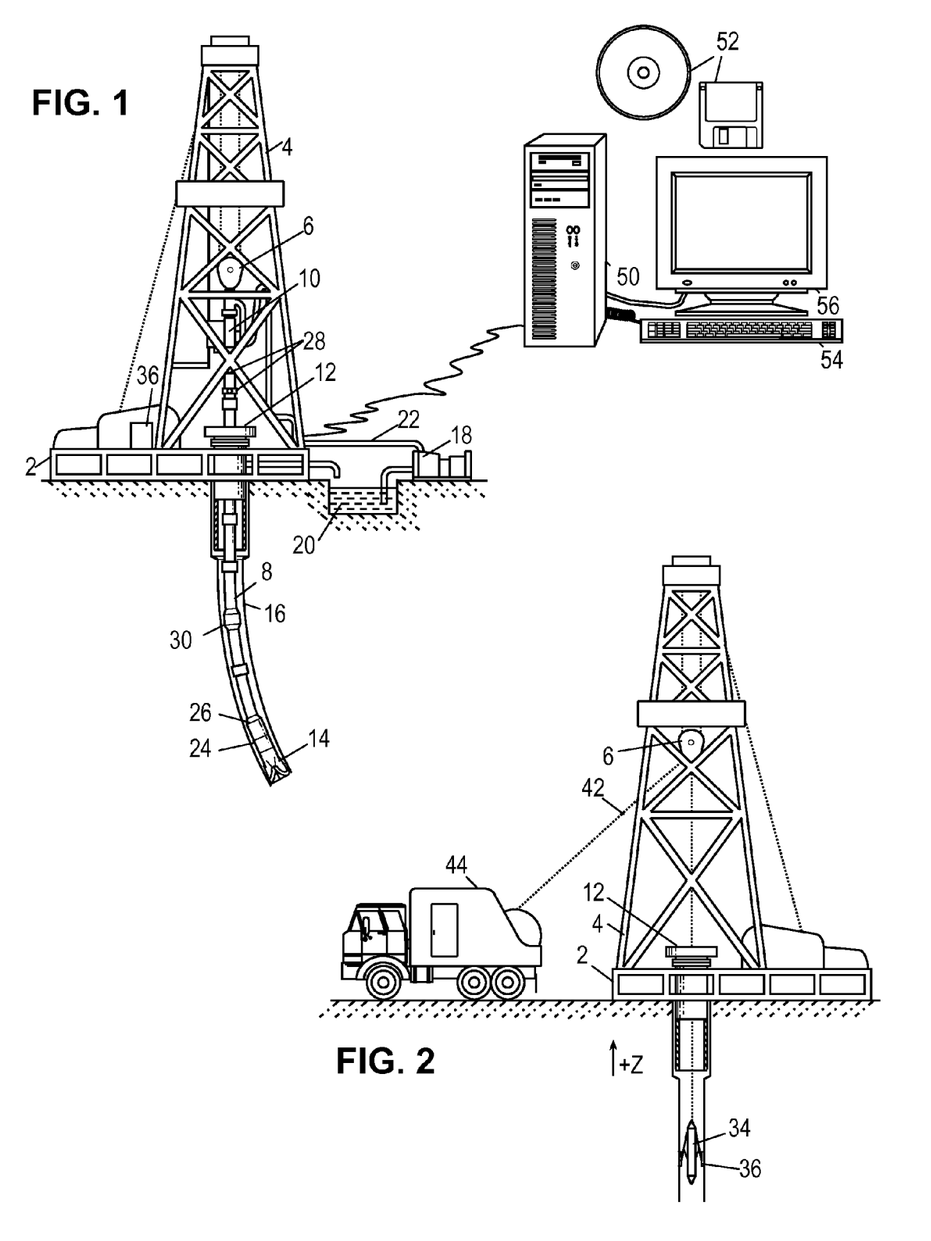
FIG. 1 shows an illustrative logging while drilling (LWD) environment.
FIG. 2 shows an illustrative wireline logging environment.

The disclosed logging tools and methods are best understood in the context of the larger systems in which they operate. Accordingly, FIG. 1 shows an illustrative logging-while-drilling ("LWD") environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

The drill bit 14 is just one piece of a bottom-hole assembly that includes one or more drill collars (thick-walled steel pipe) to provide rigidity and add weight to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

A LWD 3D imaging tool 24 can be included in the bottom-hole assembly near the bit 14. As the bit extends the borehole through the formations, 3D imaging tool 26 rotates and collects azimuthally-dependent reflection measurements that a downhole controller associates with tool position and orientation measurements to form a 3D image map of the borehole neighborhood. The measurements can be stored in internal memory and/or communicated to the surface. A telemetry sub 26 may be included in the bottom-hole assembly to maintain a communications link with the surface. Mud pulse telemetry is one common telemetry technique for transferring tool measurements to surface receivers and receiving commands from the surface, but other telemetry techniques can also be used.

At the surface, a data acquisition module 36 receives the uplink signal from the telemetry sub 26. Module 36 optionally provides some preliminary processing and digitizes the signal. A data processing system 50 (shown in FIG. 1 as a computer) receives a digital telemetry signal, demodulates the signal, and displays the tool data or well logs to a user. Software (represented in FIG. 1 as information storage media 52) governs the operation of system 50. A user interacts with system 50 and its software 52 via one or more input devices 54 and one or more output devices 56.

At various times during the drilling process, the drill string 8 may be removed from the borehole as indicated in FIG. 2. Once the drill string has been removed, logging operations can be conducted using a wireline logging tool 34, i.e., a sensing instrument sonde suspended by a cable 42 having conductors for transporting power to the tool and telemetry from the tool to the surface. A dielectric logging portion of the logging tool 34 may have sensing pads 36 that slide along the borehole wall as the tool is pulled uphole. A logging facility 44 collects measurements from the logging tool 34, and includes computing facilities for processing and storing the measurements gathered by the logging tool.

Figure 3:
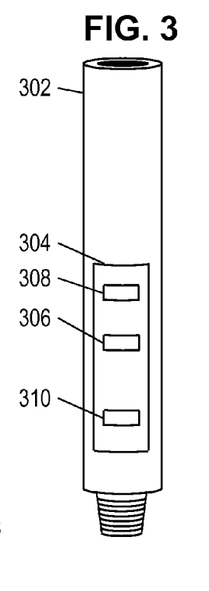
FIG. 3 shows an illustrative LWD tool having a first antenna arrangement suitable for 3D imaging.
Figure 4:
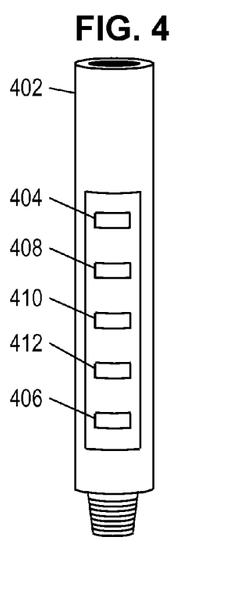
FIG. 4 shows an illustrative LWD tool having a second antenna arrangement suitable for 3D imaging.

FIG. 3 shows a side view of an illustrative LWD tool 302 having a first antenna arrangement suitable for 3D imaging. The electronics behind faceplate 304 are coupled to a transmitter 306 and two receivers 308, 310. Multiple receivers are provided to enable triangulation of the reflectors. In the embodiment of FIG. 3, the receivers are spaced at different distances and in different directions from the transmitter. In FIG. 4, an alternative LWD tool 402 has a second antenna arrangement suitable for 3D imaging. In the second antenna arrangement, three receivers 408, 410, and 412, are positioned in a row between two transmitters 404 and 406. This antenna arrangement enables compensated measurements to be made and improves measurement reliability because more information is available that can be used to correct for environmental effects. Moreover, the second antenna arrangement provides a degree of redundancy that enables the tool to continue operating even if one of the receivers and one of the transmitters fail.

As the LWD 3D imaging tools 302, 402, rotate and progress downhole at the drilling rate, each sensing surface will trace a helical path on the borehole wall. Orientation sensors within the tool can be used to associate the measurements with the sensors' positions on the borehole wall. Electronics within the tool can aggregate measurements versus position to form a detailed map (or 3D image) of the borehole wall, which can be stored for later retrieval or compressed and transmitted to the surface for timely use by the drilling team. If sufficient telemetry bandwidth is available, surface computing facilities can collect formation property measurements, orientation (azimuth) measurements, and tool position measurements, and process the collected measurements to create and display the map (or 3D image).

Figure 5A:
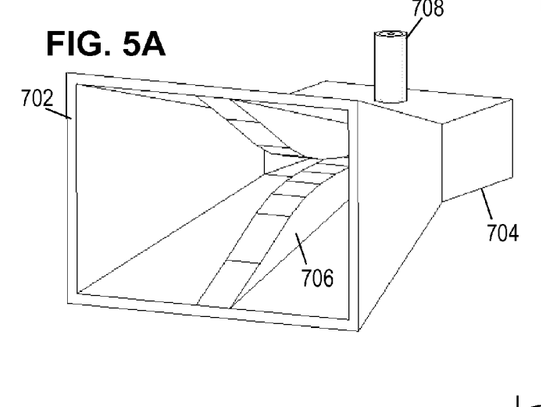
FIG. 5A shows an illustrative broadband horn antenna.
Figure 5B:
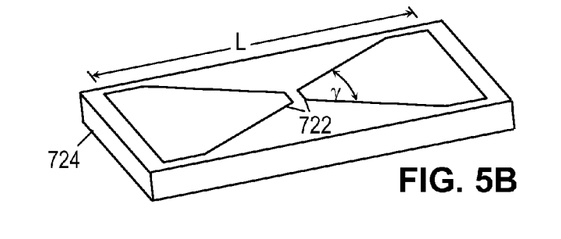
FIG. 5B shows a resistively loaded bowtie antenna.

Though the antenna arrangements of FIGS. 3 and 4 are shown on LWD tools, they can be employed in 3D imaging wireline tools. In a wireline tool, the antennas can be mounted on a rotating head to enable scanning in each direction. Alternatively, multiple azimuthally-spaced antennas can be employed to enable scanning in different directions without requiring antenna and/or tool rotation. In both the wireline and LWD 3D imaging tool embodiments, the antennas can take the form of ridged microwave horns such as that shown in FIG. 5A, or the form of resistively loaded bowtie antennas as shown in FIG. 5B. In the isometric scale drawing of FIG. 5A, the overall dimensions of the antenna horn 702 are about 2.5 cm high, 3.8 cm wide, and 4.0 cm deep, including the rectangular feed chamber 704. The antenna bandwidth is increased by the presence of two ridges 706 extending from the feed point to the aperture. A coaxial cable 708 is used to drive the antenna.

The interior of the horn 702 is filled with a dielectric material having a relative permittivity between 1 and 100. Depending on this permittivity value, the low frequency cut-off ranges from 15 GHz (relative permittivity=1) to 1 GHz (relative permittivity=100), and the bandwidth is approximately 3 GHz. If the size of the antenna is increased, the low cutoff frequency can be reduced to 300 MHz or even lower. These wide bandwidths enable these ridged horn antennas to efficiently transmit and receive short electromagnetic pulses.

The bowtie antenna shown in FIG. 5B has two conductive elements 722 mounted on a pad of microwave-absorbing material 724. The conductive elements have a generally triangular shape with an opening angle $\gamma$ of about 60°. The combined length of the conductive elements, L, is greater than or equal to half of the pulse span in space. Thus, for example, a tool operating with a pulse width of $1 \times 10^{-9}$ s in an environment where the speed of light c is $2.8 \times 10^8$ m/s would have an overall length L greater than or equal to about 14 cm. The microwave-absorbing material provides resistive loading to broaden the bandwidth of the antenna, and it further acts to reduce the influence of the conductive tool body on the performance of the antenna. The bowtie antenna structure can in many cases be easier to manufacture and install than the horn antenna.

Figure 6:
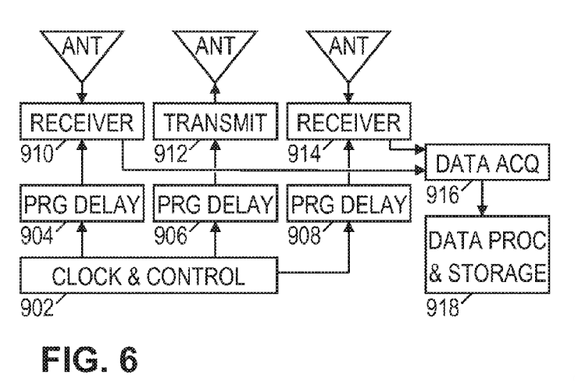
FIG. 6 is a block diagram of illustrative tool electronics.

FIG. 6 shows a block diagram of the electronics for an illustrative 3D imaging tool. The tool electronics include a system clock and control unit 902, multiple time delay lines 904, 906, 908, an electromagnetic pulse transmitter 912, two pulse wave receivers, a multichannel data acquisition unit 916, a data processing and storage unit 918, and the transmitting and receiving antennas discussed previously.

The clock and control unit 902 determines the sampling rate of the system. To do each measurement, unit 902 sends a trigger signal via the programmable delay lines 904-908 to the transmitter 912 and the receivers 910, 914. Upon the receiving of the trigger signal, the transmitter 912 generates a short electromagnetic pulse wave and emits it into space through the transmitting antenna. The trigger signal also causes the receivers start sampling the reflected signals with a dynamic gain, i.e., a gain that increases with time to at least partly compensate for signal attenuation. Since the transmitter and the receivers have different response speeds, the time delay lines are carefully adjusted to guarantee synchronization between the transmitter and the receivers. The receivers 910, 914 sample and output analog signals to the data acquisition unit 916, which converts the analog signals into digital signals. The processing and storage unit 918 processes the received digital signals to extract measurement information. The extracted information can be stored and/or transmitted via the telemetry system to the surface for real-time monitoring.

Figure 7:
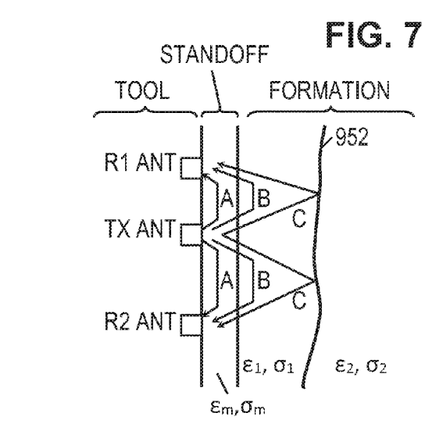
FIG. 7 shows illustrative 3D image measurement contributions.

FIG. 7 illustrates the operation of a time-domain electromagnetic (EM) tool that provides 3-D imaging of the borehole and the formation behind the borehole wall in the presence of non-conducting oil-based mud. The tool includes an array of EM short-pulse transmitters, time-synchronized receivers, and antennas. The antennas are mounted on the mandrel for LWD applications. The borehole and formation reflections are processed to find out the imaging and the eccentricity of the borehole and the formation near the borehole region, which results in a 3-D imaging of the borehole and the formation near the borehole.

FIG. 7 shows two receiver antennas placed at different spacings with respect to the transmitter antenna to provide enough measurement equations to solve parameters for multi-layer formations, and to enlarge the dynamic range of measurements. The drill collar is surrounded by oil-based mud having permittivity $\in_m$ and conductivity $\sigma_m$. The standoff distance between the antennas and the borehole wall may vary with the tool-face angle in eccentric boreholes. Outside the borehole is formation 1 (having permittivity $\in_1$ and conductivity $\sigma_1$), and possibly a second formation 2 (having permittivity $\in_2$ and conductivity $\sigma_2$), and a third etc. In the case shown in FIG. 7, the signals received by receiver antenna 1 include 3 components: EM waves propagating through the oil-based mud (A), EM waves propagating through formation 1 (B), and the waves reflected from the boundary between formation 1 and formation 2 (C). Similarly, receiver antenna 2 also receives a signal having these three components.

Figure 8:
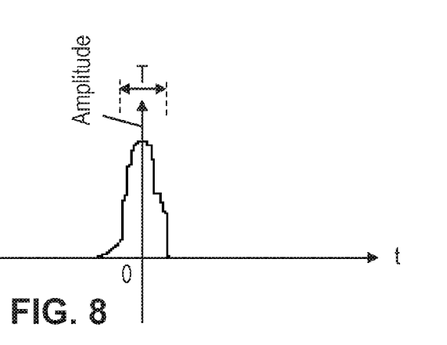
FIG. 8 shows an illustrative transmit pulse.
Figure 9:
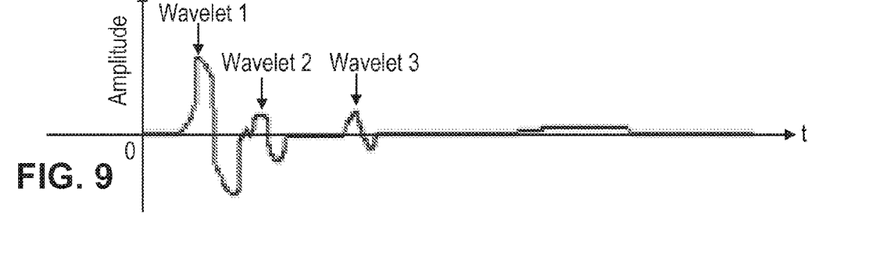
FIG. 9 shows an illustrative receive signal.

FIG. 8 shows an approximately Gaussian pulse having a pulse width T of in the range between 0.3-2.0 nanoseconds. (Some tool embodiments may support pulse widths up to 100 ns.) FIG. 9 shows the simulated signal that is received in response to the transmission of the pulse in FIG. 8. In this simulation, the transmission of a pulse wave such as that shown in FIG. 8 results in the signal received by either receive antenna having the three wavelets shown in FIG. 9 (other formation configurations can produce a greater or lesser number of wavelets). Once the three wavelets are identified from the received signals, their magnitudes and time delays can be obtained and used to solve for various parameters including $\in_m$, $\sigma_m$, $\in_1$, $\in_1$, $\in_2$, and $\sigma_2$, and the distances to the borehole wall and the formation boundaries. Because the measurements are conducted while drilling, when the drill collar completes rotation of 360° at any depth P, the azimuthal dependence of these parameters in the plane z=P can be obtained. Here the coordinate z takes the direction of the borehole axis. With the drill collar going forward, the three dimensional distribution of the formation parameters is determined, thereby yielding a 3D image of the formation.

We note here that the amplitude of the wavelet 1 shown in FIG. 9 is not only influenced by the resistivity of the drilling fluid, but also by the standoff distance of the borehole. In the eccentric cases, the amplitude of wavelet 1 can be expressed by the following function:

$$A_1 = a_0 + b_0 \sin(\phi + \theta_0) \quad (1)$$

where $\theta_0$ is an initial phase angle, $\phi$ is the tool-face angle, $a_0$ is the average amplitude in the plane z=P, and $b_0$ is determined by the eccentricity of the drilling collar. The larger the $b_0$, the more serious the eccentricity is.

Additional antennas can be used to make the measurements more reliable. The antenna arrangement of FIG. 4 exploits three receivers and two transmitters to increase the number of measurement equations. The two transmitters at the ends of the antenna array take turns transmitting EM pulses, and the signals from each of the three receivers are sampled in response to the transmitted pulses. The use of two transmitters at two ends enables the system to determine compensated measurements that cancel system heat noise and other system errors. The three receivers make measurements more reliable by providing more measurement equations and making it possible to image formations with more layers. The antenna arrangement of FIG. 4 also provides redundancy, enabling the system to continue operating even if one of the transmitters and one of the receivers break down. The disclosed tools offer a power savings in that the high-power transmit signals have extremely short durations and a low duty cycle, creating a low average power consumption.

For wireline applications, the operating principles are the same. The sensors can be mounted on a rotating head to provide full azimuthal scanning at each depth in the well. Alternatively, sensors can be mounted at different azimuthal orientations on the tool to provide "azimuthally sampled" coverage.

Figure 10:
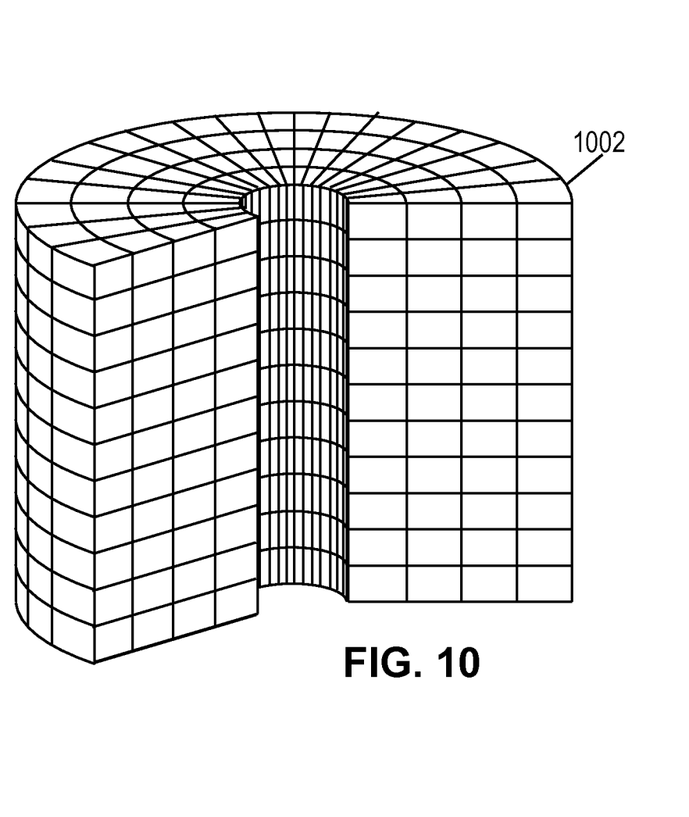
FIG. 10 shows an illustrative 3D image.

The data acquired by the 3D imaging tool can be presented in a number of forms, including a volumetric solid in cylindrical coordinates as shown in FIG. 10. The volume around the borehole is divided into a cylindrical grid 1002, with each of the cells in the grid having associated formation properties, which can be shown by color, transparency, texture, and/or other visual characteristics. To determine these properties, the data acquisition system (e.g., computer 50 of FIG. 1) processes the measured amplitudes and time delays of the pulse reflections as a function of tool position and orientation, thereby mapping out surfaces representing changes in resistivity. These surfaces can be shown directly or they can be used to derive estimates of the formation properties in the regions delineated by the surfaces. As the image is displayed on a computer screen 56, the user can interact with it to gain a better understanding of the structures shown, e.g., by viewing different cross-sections, different orientations, adjusting the colors, etc.

Numerous applications exist for a 3D imaging tool. One example is measurement of invasion depth and invasion rate, i.e., the distance that drilling fluid has penetrated into the formation. Asymmetries in the invasion rates may be indicative of stress orientations and fracture orientations, and the invasion rate can provide a measure of formation fluid mobility. With the geometry of the invaded region having been accurately determined, accurate measurement of the invaded region's resistivity can be accurately performed, further simplifying the determination of bulk formation resistivity.

Another application example is the measurement of borehole caliper, shape, texture. Travel time inversion, combined with the measurement of drilling fluid properties with a so-called "mud cell", enables accurate determination of the borehole geometry and the eccentering of the tool. From the borehole geometry measurements, an accurate 3D model of the borehole can be constructed and displayed.

Another application example is the measurement of formation dip and dip azimuth. The tool can detect formation boundary distances and measure the variation of these distances as a function of tool face angle and tool position within the borehole. These measurements enable straightforward determination of the relative dip.

In some variations of the tool, the antennas are enlarged and spaced further apart to support the use of low frequency electromagnetic signal pulses. Such low frequency pulses enable deeper signal penetrations into the formation. Deeper investigation depths may be possible, possibly even ahead of the bit. Other applications for such tool variations include mapping of natural fractures in the formation and monitoring the growth of hydraulic fractures.

The processing of reflected signals need not be limited to simple time-of-flight measurements. The tool can analyze reflection amplitudes, shapes, and waveform coda (signals indicative of multiple reflections or multiple scattering of the transmitted pulse) to determine formation properties, formation structural information, formation fluid properties, borehole fluid properties, borehole geometry, invasion zone geometry, and other petrophysical information that can be displayed in a 3D image either separately or combined.

Numerous variations and modifications will become apparent to those skilled in the art once the above disclosure is fully appreciated. It is intended that the following claims be interpreted to embrace all such variations and modifications.

What is claimed is:

1. A borehole logging method that comprises:
   conveying an imaging tool along a borehole and tracking a position of the tool;
   transmitting an electromagnetic pulse having a width less than $2\times10^{-9}$ seconds from the imaging tool in each of multiple azimuthal directions;
   receiving signals at spaced receivers of the imaging tool in response to each electromagnetic pulse, said signals corresponding to electromagnetic pulse reflections from one or more formation boundaries;
   processing each received signal to determine travel times from said electromagnetic pulse reflections; and
   forming a three-dimensional (3D) image of a formation region surrounding the borehole based at least in part on said travel times as a function of position and azimuthal direction.

2. The method of claim 1, further comprising:
   recording the 3D image in a non-transitory information storage medium; and
   displaying the 3D image.

3. The method of claim 1, wherein said processing further determines amplitudes of said reflections.

4. The method of claim 3, further comprising finding an eccentricity of the tool based on azimuthal variation of first-reflection amplitudes.

5. The method of claim 1, further comprising receiving multiple signals in response to each electromagnetic pulse, each received signal being measured by a respective one of a plurality of receiver antennas and wherein the received signals correspond to electromagnetic pulse reflections from one or more formation boundaries.

6. The method of claim 5, wherein the plurality of receiver antennas are spaced at different distances from a transmitter antenna that transmits the electromagnetic pulses.

7. The method of claim 1, wherein said transmitting includes alternately driving two, axially-spaced transmitter antennas.

8. The method claim 1, wherein said transmitting is performed by driving at least one ridged horn antenna to generate each pulse.

9. The method of claim 1, wherein said forming a 3D image further includes analyzing at least one of: reflection amplitudes, pulse shapes, and waveform coda.

10. A borehole logging tool for 3D imaging, the tool comprising:
    a first transmitter antenna that transmits electromagnetic pulses having widths less than $2\times10^{-9}$ seconds;
    first and second receiver antennas spaced axially at different distances from the first transmitter antenna to receive electromagnetic pulse reflections from one or more formation boundaries in response to the electromagnetic pulses; and
    electronics that determine travel times from said electromagnetic pulse reflections and associate said travel times with position and azimuth; and
    a data processing system that processes said travel times to form a 3D image of a formation region surrounding the borehole.

11. The tool of claim 10, further comprising:
    a second transmitter antenna axially spaced from said first transmitter antenna, wherein the first and second transmitter antennas alternately transmit electromagnetic pulses.

12. The tool of claim 11, further comprising:
    a third receiver antenna positioned midway between the first and second transmitter antennas.

13. The tool of claim 10, wherein each of the transmitter and receiver antennas is a ridged horn antenna having a bandwidth of at least 3 GHz.

14. The tool of claim 10, wherein the electronics further determine amplitudes of said reflections as a function of position and azimuth and find an eccentricity value based on said amplitudes.

15. The tool of claim 10, wherein the data processing system displays the 3D image.

16. The tool of claim 10, wherein the data processing system stores the 3D image in a non-transitory information storage medium.

17. The tool of claim 10, further comprising a drill collar that houses the transmitter and receiver antennas and the electronics, said drill collar suitable for inclusion in a bottom-hole assembly of a drill string.

18. The tool of claim 10, further comprising a wireline sonde that houses the transmitter and receiver antennas and the electronics.

* * * * *